(12) United States Patent
Kim et al.

(10) Patent No.: US 12,510,087 B2
(45) Date of Patent: Dec. 30, 2025

(54) MOTOR

(71) Applicant: LG Electronics Inc., Seoul (KR)

(72) Inventors: Mingyu Kim, Seoul (KR); Youngjin Ji, Seoul (KR); Honghyun Kim, Seoul (KR); Gyujong Jeong, Seoul (KR); Jinsub Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/705,787

(22) PCT Filed: Dec. 16, 2021

(86) PCT No.: PCT/KR2021/019179
§ 371 (c)(1),
(2) Date: Apr. 29, 2024

(87) PCT Pub. No.: WO2023/075018
PCT Pub. Date: May 4, 2023

(65) Prior Publication Data
US 2025/0003419 A1      Jan. 2, 2025

(30) Foreign Application Priority Data

Oct. 29, 2021   (KR) .......................... 10-2021-0147006

(51) Int. Cl.
*F04D 25/06*        (2006.01)
*F04D 17/16*        (2006.01)
(Continued)

(52) U.S. Cl.
CPC ........... *F04D 25/06* (2013.01); *F04D 17/165* (2013.01); *F04D 29/056* (2013.01); *H02K 9/06* (2013.01)

(58) Field of Classification Search
CPC ...... F04D 29/325; F04D 29/32; F04D 29/321; F04D 29/26; F04D 29/281; F04D 29/284;
(Continued)

(56) References Cited

U.S. PATENT DOCUMENTS 9,803,654 B2 * 10/2017  Yagi .......................... F01D 5/04
2018/0209437 A1 *  7/2018  Yoshizaki ............. F04D 29/284
(Continued)

FOREIGN PATENT DOCUMENTS

JP      2003-189522      7/2003
JP      2019-122146      7/2019
(Continued)

OTHER PUBLICATIONS

International Search Report and Written Opinion in International Appln. No. PCT/KR2021/019179, mailed on Jul. 28, 2022, 8 pages (with partial English translation).

*Primary Examiner* — Thomas Fink
(74) *Attorney, Agent, or Firm* — Fish & Richardson P.C.

(57) ABSTRACT

A motor includes a housing, a bearing disposed in the housing, a rotating shaft rotatably coupled to the bearing, an impeller cover disposed on an upper part of the housing, an impeller disposed inside the impeller cover and coupled to the rotating shaft, a magnet coupled to a lower area of the rotating shaft, a stator coupled to the housing and facing the magnet, and a coil wound around the stator. In this case, the impeller includes a body, a plurality of blades formed on an outer peripheral surface of the body, a plurality of grooves concavely formed upward from a lower surface of the body, and a coupling hole formed in a central area of the body and in which the rotating shaft is disposed.

16 Claims, 11 Drawing Sheets

(51) Int. Cl.
*F04D 29/056* (2006.01)
*H02K 9/06* (2006.01)

(58) Field of Classification Search
CPC ........ F04D 19/002; F04D 17/06; F04D 17/10; F04D 17/165; F04D 25/06; F05D 2250/712; H02K 9/06
See application file for complete search history.

(56) References Cited

U.S. PATENT DOCUMENTS

| | | | |
|---|---|---|---|
| 2018/0351431 A1* | 12/2018 | Kim | H02K 5/15 |
| 2019/0107114 A1 | 4/2019 | Song et al. | |
| 2019/0242397 A1* | 8/2019 | Adachi | F04D 29/441 |
| 2019/0305636 A1* | 10/2019 | Nabeshi | F04D 25/06 |
| 2021/0285459 A1* | 9/2021 | Barlog | F04D 29/284 |

FOREIGN PATENT DOCUMENTS

| | | |
|---|---|---|
| JP | 2021-085399 | 6/2021 |
| KR | 10-1873117 | 6/2018 |

\* cited by examiner

MOTOR

CROSS-REFERENCE TO RELATED APPLICATIONS

This application is a National Stage application under 35 U.S.C. § 371 of International Application No. PCT/KR2021/019179, filed on Dec. 16, 2021, which claims the benefit of Korean Patent Application No. 10-2021-0147006, filed on Oct. 29, 2021. The disclosures of the prior applications are incorporated by reference in their entirety.

TECHNICAL FIELD

The present disclosure relates to a motor. More particularly, the present disclosure relates to a vacuum cleaner motor.

BACKGROUND

In general, a vacuum cleaner is a home appliance that suctions foreign substances such as dust and collects them in a separate dust collection unit installed inside a main body.

Specifically, the vacuum cleaner requires high suction power to effectively suction foreign substances, and an intensity of the suction power may be proportional to a rotational force of a motor. That is, as the rotational force of the motor increases, a rotational speed of a fan connected to the motor increases, thereby increasing the suction power of foreign substances.

A vacuum cleaner motor requires a high-speed rotational motion for high performance and high suction power. In the high-speed rotational motion, deformation of an impeller occurs. A material with excellent rigidity must be used for the impeller to minimize the deformation of the impeller, but materials, such as aluminum with excellent rigidity, have a problem in that the materials are difficult to apply to a complex impeller shape.

Hence, in order to apply to the complex impeller shape, the impeller is generally made of high-strength plastic material. In this case, the impeller is deformed, and a collision occurs between the impeller and an impeller cover or wear occurs due to contact between the impeller and the impeller cover. When an air gap between a blade of the impeller and the impeller cover increases so as to prevent the collision between the impeller and the impeller cover, or an air gap between the blade of the impeller and an inner surface of the impeller cover increases due to wear of the blade of the impeller, there was a problem in that the efficiency of the motor was reduced.

SUMMARY

An object of the present disclosure is to provide a motor that can prevent a contact between a blade of an impeller and an impeller cover by minimizing deformation of the impeller.

Another object of the present disclosure is to provide a motor that can improve efficiency by minimizing an air gap between a blade of an impeller and an inner surface of an impeller cover.

Another object of the present disclosure is to provide a motor that can reduce the manufacturing cost of the product by not adding a separate configuration.

Another object of the present disclosure is to provide a motor that can reduce the material cost and reduce manufacturing processes.

To achieve the above-described and other objects, in one aspect of the present disclosure, there is provided a motor comprising a housing, a bearing disposed in the housing, a rotating shaft rotatably coupled to the bearing, an impeller cover disposed on an upper part of the housing, an impeller disposed inside the impeller cover and coupled to the rotating shaft, a magnet coupled to a lower area of the rotating shaft, a stator coupled to the housing and facing the magnet, and a coil wound around the stator. In this case, the impeller may include a body, a plurality of blades formed on an outer peripheral surface of the body, a plurality of grooves concavely formed upward from a lower surface of the body, and a coupling hole formed in a central area of the body and in which the rotating shaft is disposed.

Through this, since a weight of a lower area of the body of the impeller increases, the present disclosure can prevent a contact between the blades of the impeller and the impeller cover by minimizing deformation of the impeller that occurs during a high-speed rotation. Further, since the contact between the blades of the impeller and the impeller cover is prevented, the present disclosure can improve efficiency of the motor by minimizing an air gap between the blades of the impeller and an inner surface of the impeller cover. In addition, since a separate configuration is not added to the impeller, the present disclosure can reduce the manufacturing cost of the product.

Furthermore, the present disclosure can reduce the material cost through the plurality of grooves. In addition, the present disclosure can reduce the manufacturing processes by reducing a cooling time due to an excessive thickness of the body through the plurality of grooves, and can reduce deformation of the product, such as a sink mark, due to a shrinkage phenomenon that occurs during the cooling.

The plurality of grooves may be radially spaced apart from each other.

Each of the plurality of grooves may extend in a circumferential direction.

Based on a lower surface of the impeller being viewed from a lower part of the impeller, an outer peripheral surface and an inner peripheral surface of each of the plurality of grooves may be formed in a circular shape.

The plurality of grooves may include a first groove extending in the circumferential direction and a second groove disposed inside the first groove and extending in the circumferential direction.

An axial height of the first groove may be less than an axial height of the second groove.

The motor may further comprise a first stepped portion configured to connect an inner end of the first groove to an outer end of the second groove and disposed above the lower surface of the body.

The motor may further comprise a second stepped portion configured to connect an inner end of the second groove to the coupling hole and disposed above the lower surface of the body.

In this case, the second stepped portion may be disposed above the first stepped portion.

A radial length between the first groove and the second groove may be greater than a radial length between the first groove and the outer peripheral surface of the body.

A radial length between the first groove and the second groove may be greater than a radial length between the second groove and the coupling hole.

An inner surface of the second groove may have a constant radius of curvature.

A radius of curvature of a radially outer area of an inner surface of the first groove may be greater than a radius of curvature of a remaining area of the inner surface of the first groove.

The plurality of grooves may be concentric.

An axial height of each of the plurality of grooves may be 0.1 to 0.8 times an axial height of the body of the impeller.

The present disclosure can provide a motor that prevents a contact between a blade of an impeller and an impeller cover by minimizing deformation of the impeller.

The present disclosure can also provide a motor that improves efficiency by minimizing an air gap between a blade of an impeller and an inner surface of an impeller cover.

The present disclosure can also provide a motor that reduces the manufacturing cost of the product by not adding a separate configuration.

The present disclosure can also provide a motor that reduces the material cost and reduces manufacturing processes.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

It should be understood that when a component is described as being "connected to" or "coupled to" other component, it may be directly connected or coupled to the other component or intervening component(s) may be present.

It will be noted that a detailed description of known arts will be omitted if it is determined that the detailed description of the known arts can obscure embodiments of the present disclosure. The accompanying drawings are used to help easily understand various technical features and it should be understood that embodiments presented herein are not limited by the accompanying drawings. As such, the present disclosure should be understood to extend to any alterations, equivalents and substitutes in addition to those which are particularly set out in the accompanying drawings.

In addition, a term of "disclosure" may be replaced by terms such as document, specification, description, etc.

Figure 1:
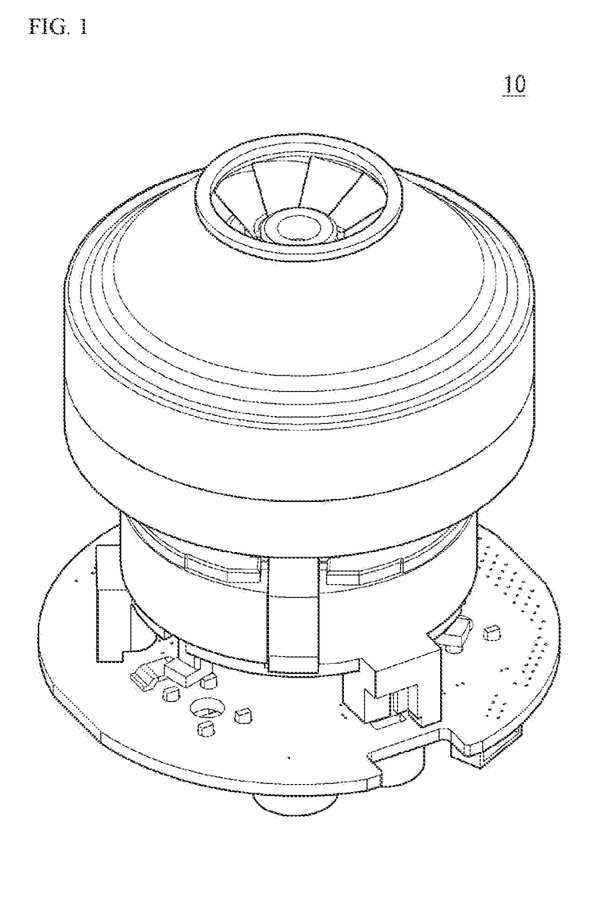
FIG. 1 is a perspective view of a motor according to an embodiment of the present disclosure.
Figure 2:
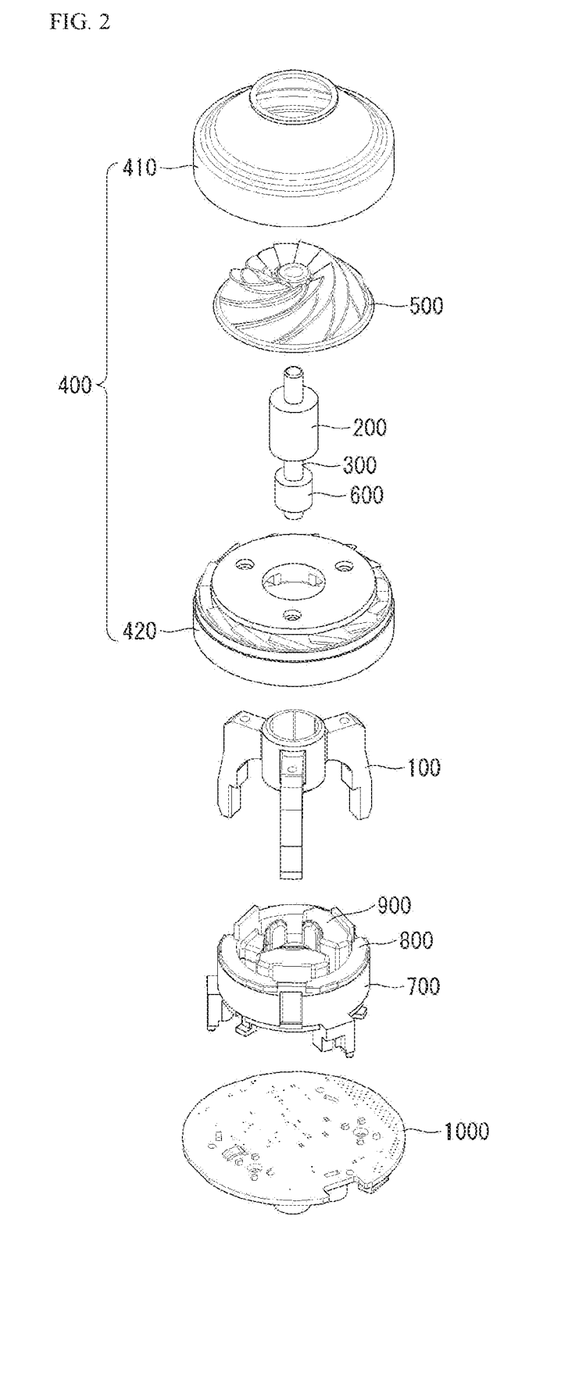
FIG. 2 is an exploded perspective view of a motor according to an embodiment of the present disclosure.
Figure 3:
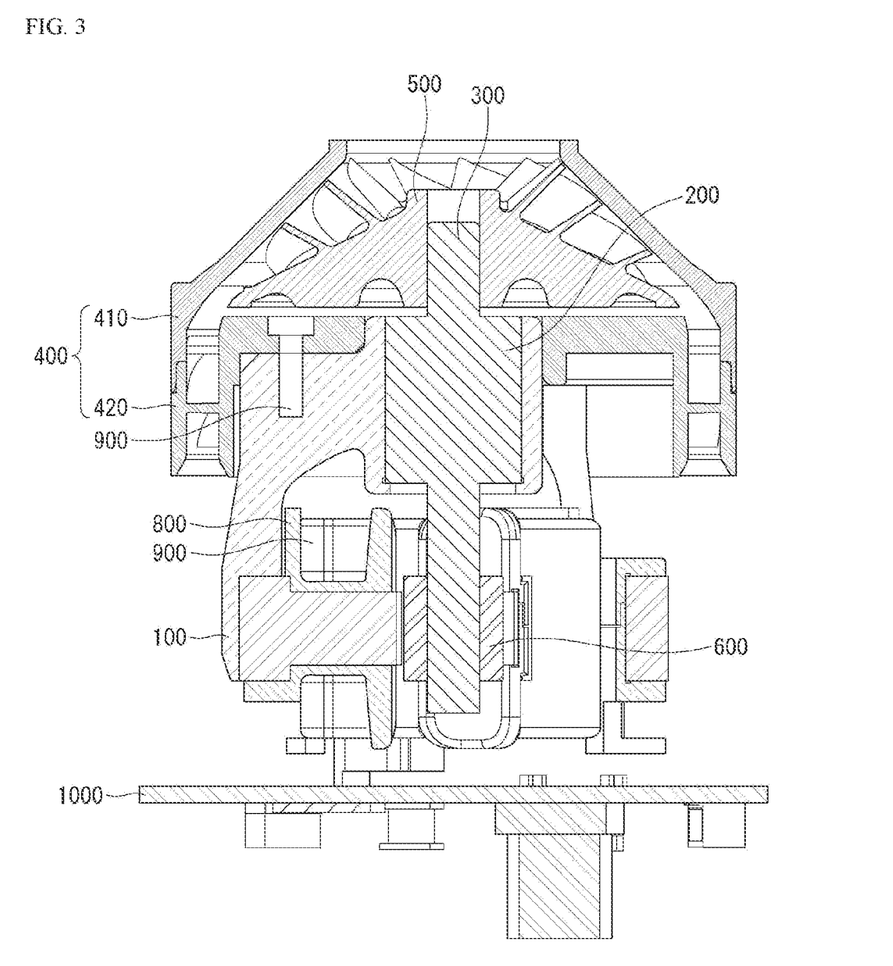
FIG. 3 is a cross-sectional view of a motor according to an embodiment of the present disclosure.
Figure 4:
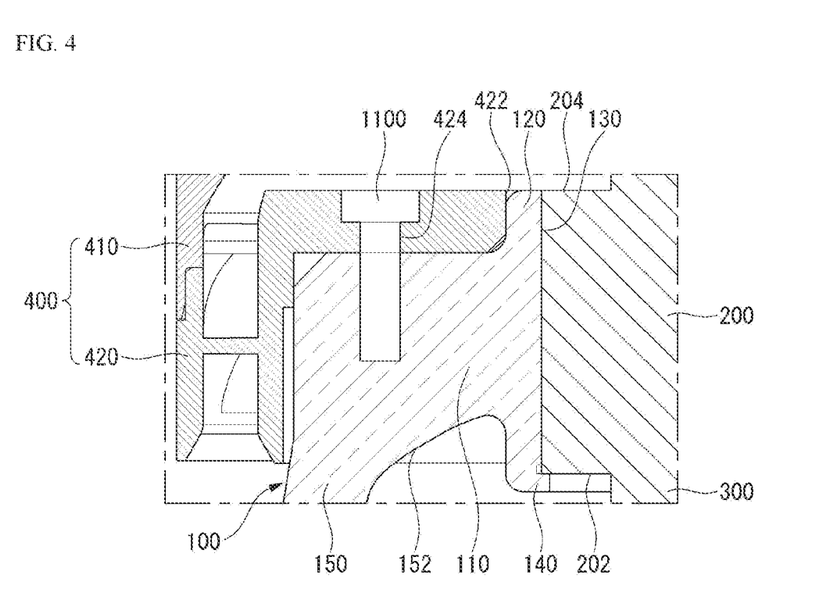
FIG. 4 is an enlarged view of a portion A of FIG. 3.
Figure 5:
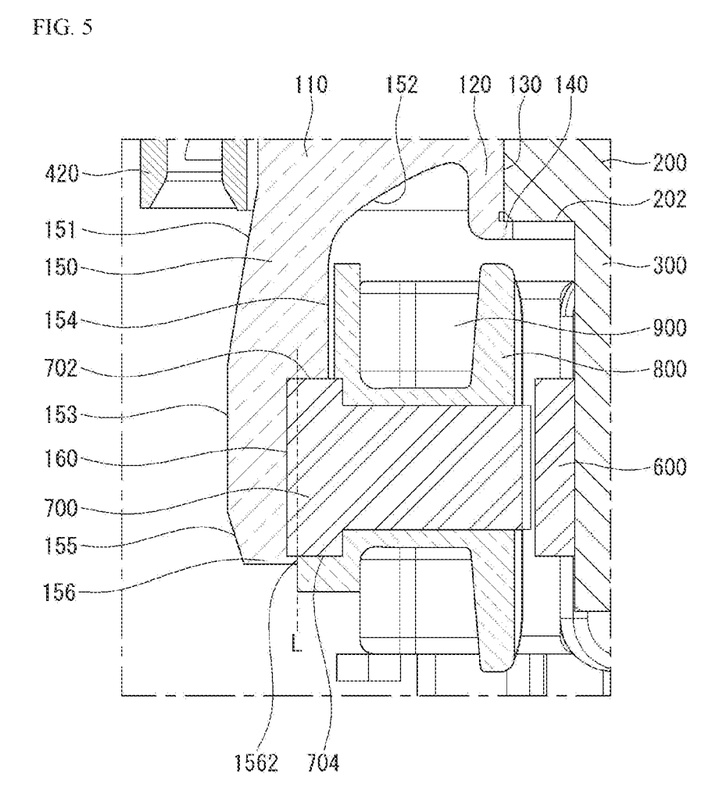
FIG. 5 is an enlarged view of a portion B of FIG. 3.
Figure 6:
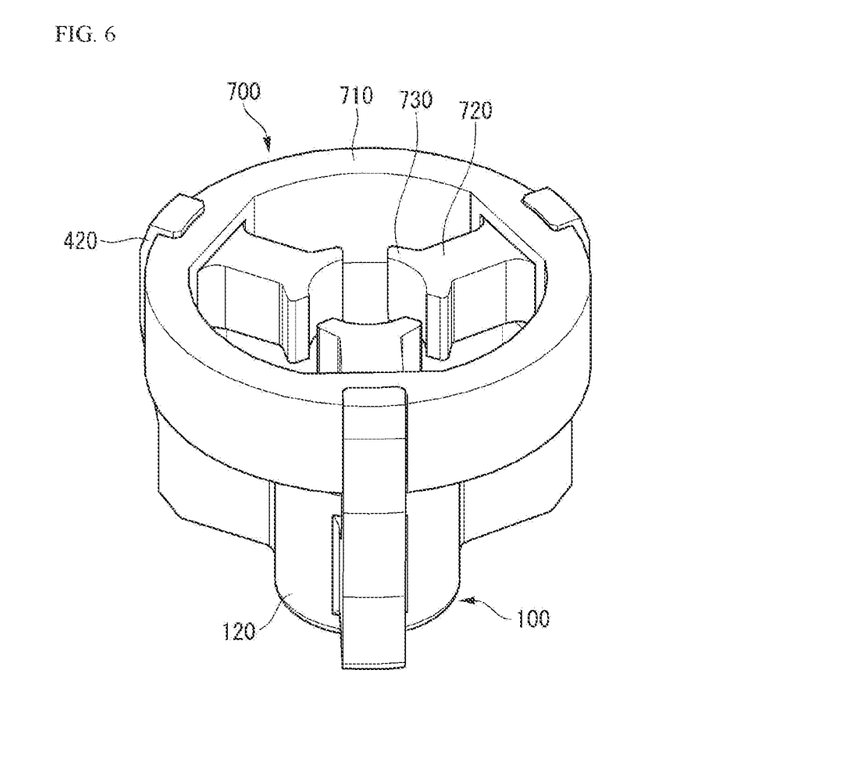
FIG. 6 is a perspective view of a housing and a stator of a motor according to an embodiment of the present disclosure.
Figure 7:
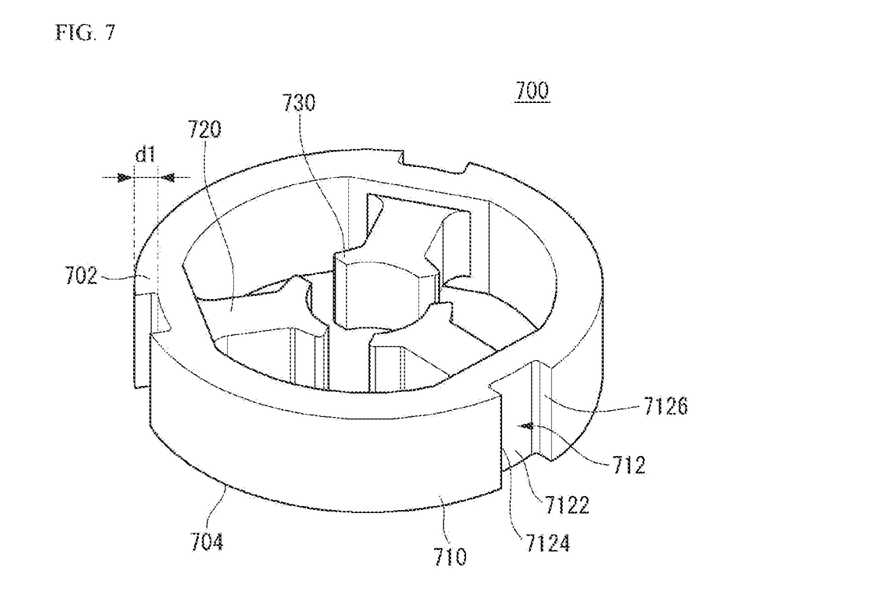
FIG. 7 is a perspective view of a stator of a motor according to an embodiment of the present disclosure.
Figure 8:
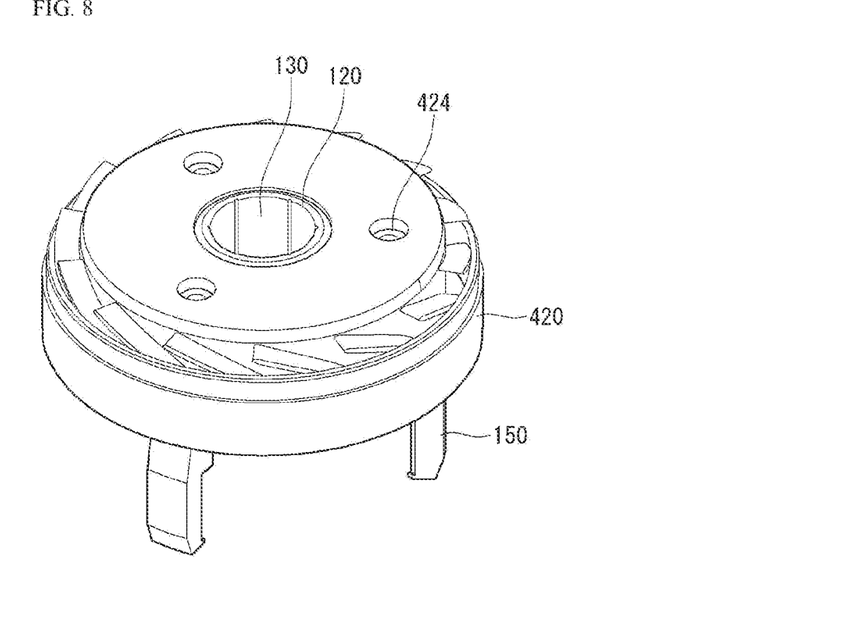
FIGS. 8 and 9 are perspective views of a partial configuration of an impeller cover and a housing according to an embodiment of the present disclosure.
Figure 9:
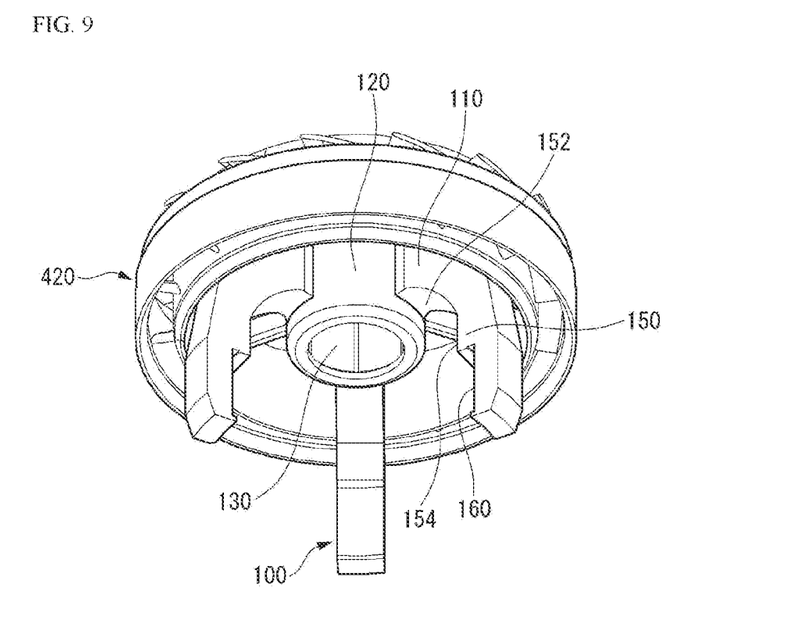
Figure 10:
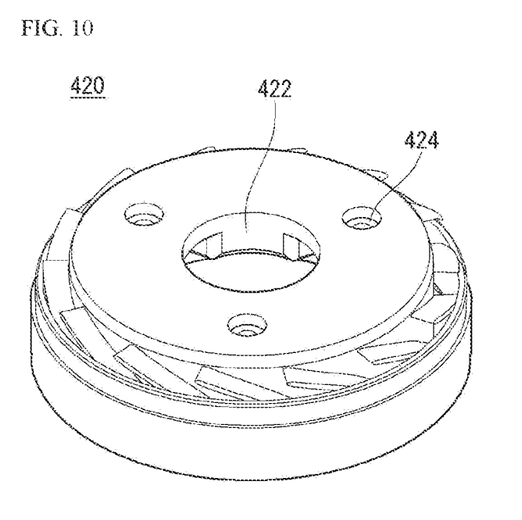
FIG. 10 is a perspective view of a partial configuration of an impeller cover according to an embodiment of the present disclosure.
Figure 11:
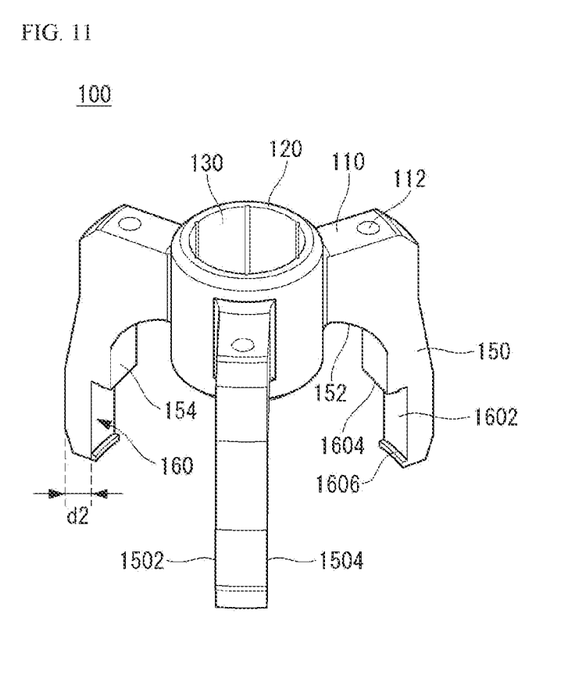
FIGS. 11 and 12 are perspective views of a housing according to an embodiment of the present disclosure.
Figure 12:
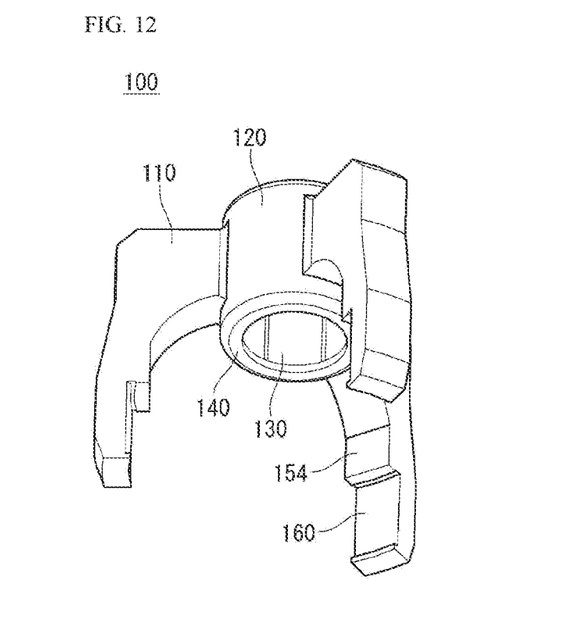

FIG. 1 is a perspective view of a motor according to an embodiment of the present disclosure. FIG. 2 is an exploded perspective view of a motor according to an embodiment of the present disclosure. FIG. 3 is a cross-sectional view of a motor according to an embodiment of the present disclosure. FIG. 4 is an enlarged view of a portion A of FIG. 3. FIG. 5 is an enlarged view of a portion B of FIG. 3. FIG. 6 is a perspective view of a housing and a stator of a motor according to an embodiment of the present disclosure. FIG. 7 is a perspective view of a stator of a motor according to an embodiment of the present disclosure. FIGS. 8 and 9 are perspective views of a partial configuration of an impeller cover and a housing according to an embodiment of the present disclosure. FIG. 10 is a perspective view of a partial configuration of an impeller cover according to an embodiment of the present disclosure. FIGS. 11 and 12 are perspective views of a housing according to an embodiment of the present disclosure.

Referring to FIGS. 1 to 12, a motor 10 according to an embodiment of the present disclosure may include a housing 100, a bearing 200, a rotating shaft 300, an impeller cover 400, an impeller 500, a magnet 600, a stator 700, an insulator 800, a coil 900, a controller 1000, and a coupling member 1100. However, the motor 10 can be implemented except for some of these components and does not exclude additional components.

The motor 10 according to an embodiment of the present disclosure is described using a motor used in a vacuum cleaner as an example, but is not limited thereto and can be applied to various devices.

In an embodiment of the present disclosure, an axial direction (or axially) can be understood to indicate a vertical direction based on FIG. 3, and a radial direction (or radially) can be understood to indicate a horizontal direction based on FIG. 3.

The housing 100 may be coupled to the impeller cover 400. An upper surface of the housing 100 may be coupled to a second impeller cover 420 of the impeller cover 400. The housing 100 may be disposed inside the second impeller cover 420. The stator 700 may be coupled to the housing 100. The stator 700 may be coupled to an inner side of the housing 100. The bearing 200 may be coupled to the housing 100. The bearing 200 may be coupled to the inner side of the housing 100. The housing 100 may be axially spaced apart from the impeller 500. The bearing 200, the rotating shaft 300, the magnet 600, the stator 700, the insulator 800, and the coil 900 may be disposed inside the housing 100.

The housing 100 may include a flange portion 110, a coupling portion 120, a bearing hole 130, a bearing protrusion 140, a plurality of extensions 150, and a stator groove 160.

The flange portion 110 may extend radially. An upper surface of the flange portion 110 may be coupled to the impeller cover 400. The upper surface of the flange portion 110 may be bolted to a lower surface of the second impeller cover 420. A fastening groove 112 may be formed on the upper surface of the flange portion 110 to be bolted to the lower surface of the second impeller cover 420. The fastening groove 112 of the flange portion 110 may axially overlap a fastening hole 424 of the second impeller cover 420. At least a portion of a radially outer surface of the flange portion 110 may be in contact with an inner surface of the impeller cover 400. At least a portion of the radially outer surface of the flange portion 110 may be in contact with an inner surface of the second impeller cover 420. The coupling portion 120 may be formed inside the flange portion 110.

The coupling portion 120 may be formed in a central area of the flange portion 110. The coupling portion 120 may extend axially upward or downward from a radially inner area of the flange portion 110. The coupling portion 120 may be formed in a cylindrical shape. The bearing 200 may be coupled to the coupling portion 120. An axial length or height of the coupling portion 120 may be greater than an axial length or height of the flange portion 110. Through this, the coupling portion 120 can stably support the bearing 200. An outer peripheral surface or outer surface of an upper end of the coupling portion 120 may be in contact with the impeller cover 400. An outer peripheral surface or outer surface of an upper area of the coupling portion 120 may be in contact with an inner surface or inner peripheral surface 422 of the second impeller cover 420. Through this, a coupling position of the impeller cover 400 with respect to the housing 100 can be guided.

The bearing hole 130 may be formed in a central area of the coupling portion 120. The bearing hole 130 may extend axially. The bearing 200 may be disposed in the bearing hole 130. An axial length or height of the bearing hole 130 may correspond to an axial length or height of the bearing 200.

The bearing protrusion 140 may extend inward from the coupling portion 120. The bearing protrusion 140 may extend radially inward from a lower end of the coupling portion 120. The bearing protrusion 140 may axially support a lower end 202 of the bearing 200. The magnet 600 may be axially supported through an electronic interaction with the stator 700 and/or the coil 900, and the axially lower end 202 of the bearing 200 coupled to the rotating shaft 300 coupled to the magnet 600 may be supported by the bearing protrusion 140. Hence, the bearing 200 can be prevented from being separated from the housing 100 or moving axially.

An embodiment of the present disclosure describes that the bearing protrusion 140 extends radially inward from the lower end of the coupling portion 120 so as to avoid interference with the impeller 500 and facilitate coupling between the components, by way of example. However, the bearing protrusion 140 may extend radially inward from the upper end and the lower end of the coupling portion 120 for structural stability and may axially support both an upper end 204 and the lower end 202 of the bearing 200.

The plurality of extensions 150 may extend downward from the flange portion 110. The plurality of extensions 150 may extend downward from a radially outer area of the flange portion 110. The stator 700 may be coupled to the plurality of extensions 150. The stator groove 160 to which the stator 700 is coupled may be formed in a lower area of each of the plurality of extensions 150. An outermost surface of each of the plurality of extensions 150 may be disposed more radially outward than the outer surface of the flange portion 110. Through this, space efficiency can be improved.

An embodiment of the present disclosure describes three extensions 150 by way of example, but is not limited thereto and can variously change the number of at least one extension 150.

An inner surface of each of the plurality of extensions 150 may include a curved portion 152. The curved portion 152 may be connected to the flange portion 110. A radial radius of the curved portion 152 may increase as the curved portion 152 goes downward. Through this, the space efficiency can be improved. The curved portion 152 may radially overlap the bearing 200. The curved portion 152 may not radially overlap the magnet 600, the stator 700, the insulator 800, and the coil 900. The curved portion 152 may radially overlap the lower area of the second impeller cover 420.

Each inner surface of the plurality of extensions 150 may include a straight portion 154. The straight portion 154 may extend axially downward from the curved portion 152. A radius of the straight portion 154 may be constant in the axial direction. The straight portion 154 may radially overlap the magnet 600, the stator 700, the insulator 800, and the coil 900. The stator groove 160 may be formed in the straight portion 154.

The stator groove 160 may be concavely formed radially outward from the inner surface of the housing 100. The stator groove 160 may be formed in the lower area of each of the plurality of extensions 150. The stator groove 160 may be formed in the straight portion 154. The stator 700 may be coupled to the stator groove 160. A stator core 710 of the stator 700 may be press-fitted into the stator groove 160.

The stator groove 160 may include a depressed surface 1602 that is recessed radially outward from the inner surface of each of the plurality of extensions 150, an upper contact surface 1604 that extends from an upper end of the depressed surface 1602 to the inner surface of each of the plurality of extensions 150 and is in contact with an upper surface 702 of the stator 700, and a lower contact surface 1606 that extends from a lower end of the depressed surface 1602 to the inner surface of each of the plurality of extensions 150 and is in contact with a lower surface 704 of the stator 700.

In this case, a radial length of the lower contact surface 1606 of the stator groove 160 may be less than a radial length of the upper contact surface 1604.

An outer peripheral surface of the stator 700 may be coupled to the depressed surface 1602 of the stator groove 160 by shrink fitting. When heat is applied to the plurality of extensions 150 of the housing 100 in a state in which the stator 700 and the housing 100 are separated from each other, the plurality of extensions 150 deform outwardly in the radial direction due to thermal expansion of the plurality of extensions 150. In this case, a housing groove 712 of the stator 700 passes through an inner surface 1562 of a lower end 156 of each of the plurality of extensions 150. Further, the inner surfaces of the plurality of extensions 150 must be sufficiently deformed to allow the housing groove 712 of the stator 700 to pass through the inner surface 1562 of the lower end 156 of the plurality of extensions 150. Therefore, it is preferable that the radial length of the lower contact surface 1606 of the stator groove 160 is less than the radial length of the upper contact surface 1604. Afterwards, when the heat cools down, the depressed surface 1602 of the stator groove 160 and a depressed surface 7122 of the housing groove 712 may be press-fitted to each other.

An axial length or height of the stator groove 160 may be less than an axial length or height of the stator 700. Through this, since the stator 700 can be press-fitted into the stator groove 160, the stator 700 can be fixed to the stator groove 160 without a separate configuration.

The plurality of extensions 150 may be coupled to the housing groove 712 of the stator 700. A circumferential length of the plurality of extensions 150 may be less than a circumferential length of the housing groove 712 of the stator 700. Through this, since the plurality of extensions 150 can be press-fitted into the housing groove 712 of the stator 700, the stator 700 can be fixed to the housing 100 without a separate configuration.

A straight line L extending the inner surface 1562 of the lower end 156 of the plurality of extensions 150 in the vertical direction may be disposed between the depressed surface 1602 of the stator groove 160 and the straight portion 154. The lower area of the plurality of extensions 150 where the stator groove 160 is formed may be formed in a 'L'-shape. Through this, the space efficiency can be improved.

An outer surface of each of the plurality of extensions 150 may include a first area 151 that is disposed radially outward as the outer surface goes downward, a second area 153 extending downward from the first area 151, and a third area 155 that is disposed radially inward as the outer surface goes downward from the second area 153. A vertical length of the second area 153 may be greater than a vertical length of the third area 155, and a vertical length of the first area 151 may be greater than the vertical length of the second area 153. In this case, the stator 170 may radially overlap the second and third areas 153 and 155 and may not radially overlap the first area 151. Through this, the space efficiency can be improved.

The present disclosure can reduce the generation of vibration and noise by maintaining a constant distance between the magnet 600, which is a mover, and the stator 700, which is a stator, through the shape of the housing 100, and thus can improve the efficiency of the motor 10. In addition, the present disclosure can minimize the deformation by fixing the stator 700 to the housing 100 without any additional configuration, and thus can reduce the number of components.

The bearing 200 may be disposed inside the housing 100. The bearing 200 may be coupled to the coupling portion 120 of the housing 100. The bearing 200 may be disposed in the bearing hole 130 of the housing 100. The lower end 202 of the bearing 200 may be axially supported by the bearing protrusion 140. The bearing 200 may be formed in a cylindrical shape. The rotating shaft 300 may be rotatably coupled to the bearing 200.

The rotating shaft 300 may be coupled to the bearing 200. The rotating shaft 300 may be rotatably coupled to the bearing 200. The rotating shaft 300 may extend axially. The magnet 600 may be coupled to the rotating shaft 300. The rotating shaft 300 may be coupled to the impeller 500. The rotating shaft 300 may rotate together with the magnet 600 to rotate the impeller 500 in one direction or another direction.

The impeller cover 400 may be disposed on the upper part of the housing 100. The impeller cover 400 may be coupled to the upper surface of the flange portion 110 of the housing 100. The impeller cover 100 may be bolted to the upper surface of the flange portion 110 of the housing 100 through the coupling member 1100. The impeller 500 may be disposed inside the impeller cover 400. The inner surface of the impeller cover 400 may be radially spaced apart from the impeller 500.

The impeller cover 400 may include a first impeller cover 410. The first impeller cover 410 may be coupled to the second impeller cover 420 through a stepped portion. A stepped portion of a lower end of the first impeller cover 410 may be engaged and coupled with a stepped portion of an upper end of a radially outer area of the second impeller cover 420. The impeller 500 may be disposed inside the first impeller cover 410. A blade of the impeller 500 may be disposed inside the first impeller cover 410. A radius of the first impeller cover 410 may decrease as it goes upward in the axial direction. The first impeller cover 410 may be formed in a cone shape with an open central area.

The impeller cover 400 may include the second impeller cover 420. The second impeller cover 420 may be coupled to the first impeller cover 410 through the stepped portion. The stepped portion of the upper end of the radially outer area of the second impeller cover 420 may be engaged and coupled with the stepped portion of the lower end of the first impeller cover 410. The second impeller cover 420 may be bolted to the upper surface of the flange portion 110 of the housing 100 through the coupling member 1100. The second impeller cover 420 may include a fastening hole 424 penetrated by the coupling member 1100. The inner peripheral surface 422 of the second impeller cover 420 may be in contact with the outer peripheral surface of the upper area of the coupling portion 120 of the housing 100. The second impeller cover 420 may be referred to as a guide vane or a diffuser assembly. The second impeller cover 420 may guide air suctioned through the first impeller cover 410 toward the controller 1000.

The impeller 500 may be disposed inside the impeller cover 400. The impeller 500 may be coupled to the rotating shaft 300. The impeller 500 may rotate in one direction or another direction inside the impeller cover 400 based on the rotation of the rotating shaft 300.

The magnet 600 may be coupled to the rotating shaft 300. The magnet 600 may be coupled to a lower area of the rotating shaft 300. The magnet 600 may face the stator 700 on which the coil 900 is wound. The magnet 600 may face a teeth shoe 730 of the stator 700. The magnet 600 may be formed in a cylindrical shape. The magnet 600 may radially overlap the plurality of extensions 150 of the housing 100. The magnet 600 may radially overlap the straight portion 154 of the housing 100. The magnet 600 may radially overlap the stator groove 160.

The stator 700 may be coupled to the housing 100. The stator 700 may be coupled to the plurality of extensions 150 of the housing 100. The stator 700 may be press-fitted into the stator groove 160 of the housing 100. The stator 700 may face the magnet 600. Through this, the present disclosure can reduce the generation of vibration and noise by maintaining a constant distance between the magnet 600, which is a mover, and the stator 700, which is a stator, and thus can improve the efficiency of the motor 10. In addition, the present disclosure can minimize the deformation by fixing the stator 700 to the housing 100 without any additional configuration, and thus can reduce the number of components.

The stator 700 may include the stator core 710. The stator core 710 may be formed in a cylindrical shape as a whole. The stator core 710 may be formed by axially stacking a plurality of core plates. The stator core 710 may be coupled to the housing 100. An axial length or height of the stator core 710 may be greater than the length or height of the stator groove 160. The stator core 710 may be press-fitted into the stator groove 160.

The stator core 710 may include the housing groove 712 formed on its outer peripheral surface. The housing groove 712 may extend inward from the outer peripheral surface of the stator core 710 and may extend axially. At least one extension 150 of the housing 100 may be press-fitted into the housing groove 712. The circumferential length of the housing groove 712 may be less than the circumferential length of the plurality of extensions 150. A depressed surface of the housing groove 712 may be in contact with the stator groove 160 formed in the plurality of extensions 150.

The housing groove 712 may include the depressed surface 7122 that is recessed radially inward from the outer peripheral surface of the stator 700, and side surfaces 7124 and 7126 that extend from each of circumferential direction ends of the depressed surface 7122 to the outer peripheral surface of the stator 700 and are in contact with both side surfaces 1502 and 1504 of each of the plurality of extensions 150. In this case, the depressed surface 7122 may extend from the upper surface 702 to the lower surface 704 of the stator 700.

The depressed surface 7122 of the housing groove 712 may be in contact with the depressed surface 1602 of the stator groove 160. The housing groove 712 may extend in the vertical direction and penetrate the upper surface 702 and the lower surface 704 of the stator 700. Both side surfaces 1502 and 1504 of the plurality of extensions 150 may be press-fitted into the housing groove 712. A radial depth d1 of the housing groove 712 may be less than a radial width d2 of the lower area of the plurality of extensions 150 where the stator groove 160 is formed. Through this, the present disclosure can provide a space where the lower ends 156 of the plurality of extensions 150 can support the lower surface 704 of the stator 700.

The stator 700 may include a plurality of teeth portions 720. The plurality of teeth portions 720 may extend radially inward from the stator core 710. The coil 900 may be wound around the plurality of teeth portions 720. An embodiment of the present disclosure describes that the insulator 800 is disposed on the plurality of teeth portions 720 and the coil 900 is wound around the insulator 800, by way of example. However, the coil 900 may be directly wound around the plurality of teeth portions 720 without the insulator 800.

The stator 700 may include a plurality of teeth shoes 730. The plurality of teeth shoes 730 may extend from the plurality of teeth portions 720 in the circumferential direction, respectively. The plurality of teeth shoes 730 may face the magnet 600.

An embodiment of the present disclosure describes that the three teeth portions 720 and the three teeth shoes 730 are used, by way of example, but is not limited thereto and can variously change the number of teeth portions 720 and the number of teeth shoes 730 based on the type and the size of the motor 10.

The insulator 800 may be coupled to the stator 700. The insulator 800 may include a plurality of insulator units respectively disposed on the plurality of teeth portions 720 of the stator 700. A plurality of coil units may be wound around the plurality of insulator units, respectively.

The coil 900 may be wound around the stator 700. The coil 900 may be wound around the insulator 800. The coil 900 may include the plurality of coil units respectively wound around the plurality of insulator units. Only a part of the plurality of coil units may radially overlap the stator groove 160. The coil 900 may not radially overlap the curved portion 152 of the housing 100. When power is supplied to the coil 900, an electric field may be formed in the stator 700, and the rotating shaft 300 may rotate in one direction or another direction by an electromagnetic interaction with the magnet 600. The coil 900 may be electrically connected to the controller 1000. The controller 1000 may be disposed on the lower part of the housing 100. The controller 1000 may be electrically connected to the coil 900. The controller 1000 may include a printed circuit board (PCB), a plurality of elements disposed on the PCB, and a power supply unit connected to a power source. The controller 1000 may control power and/or current provided to the coil 900.

The coupling member 1100 may bolt the impeller cover 400 to the housing 100. The coupling member 1100 may pass through the fastening hole 424 of the second impeller cover 420 and may be inserted into the fastening groove 112 of the housing 100.

Figure 13:
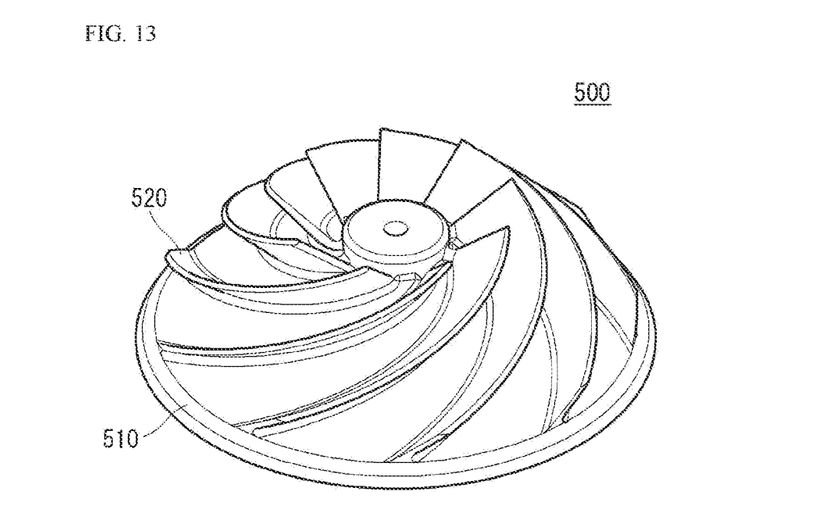
FIGS. 13 and 14 are perspective views of an impeller according to an embodiment of the present disclosure.
Figure 14:
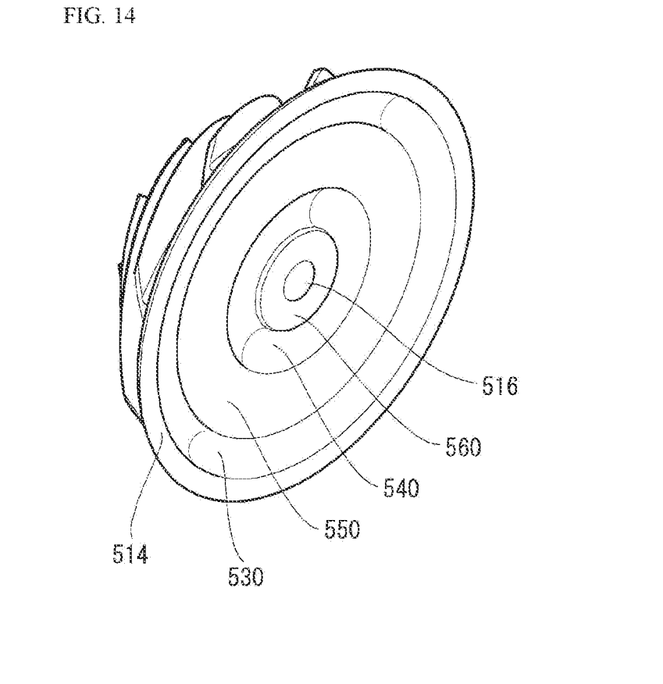
Figure 15:
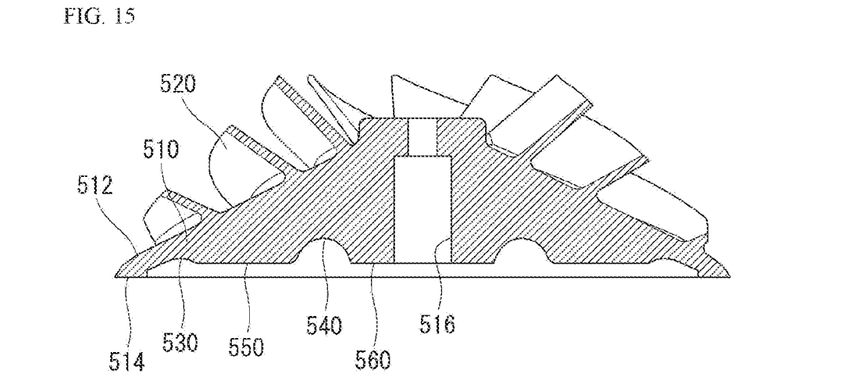
FIGS. 15 to 17 are cross-sectional views of an impeller according to embodiments of the present disclosure.
Figure 16:
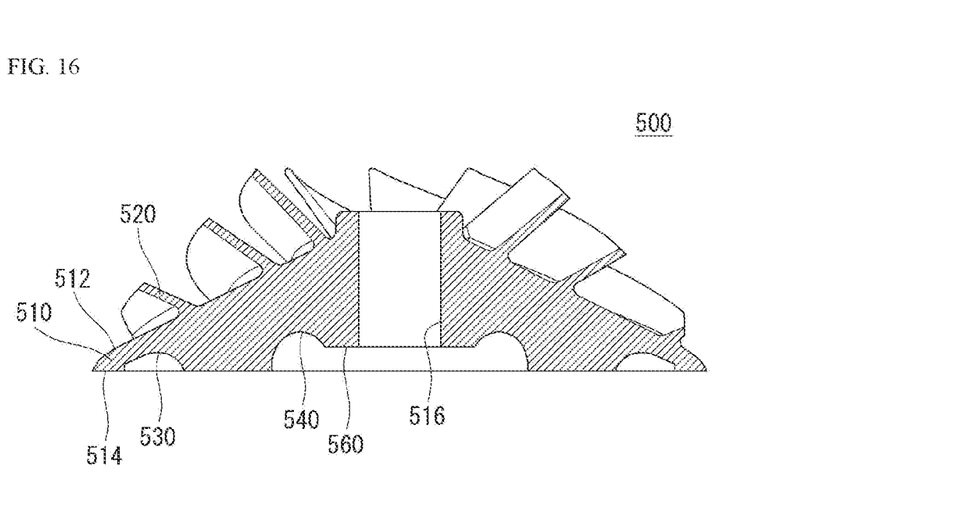
Figure 17:
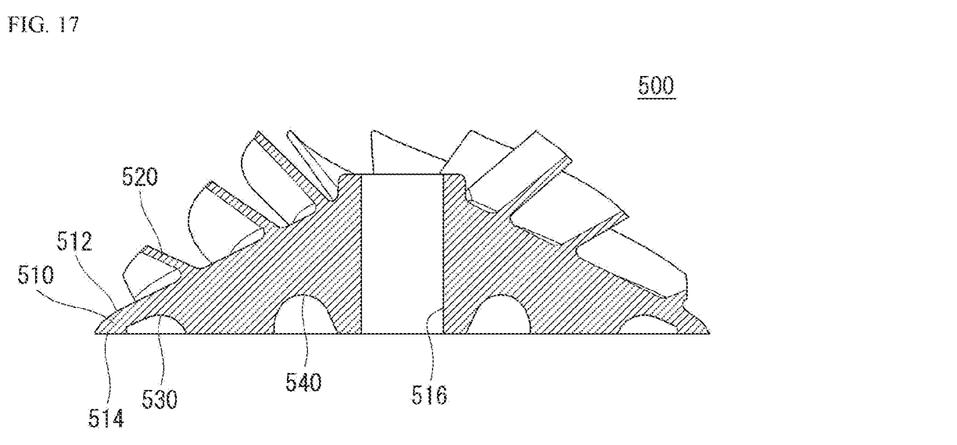

FIGS. 13 and 14 are perspective views of an impeller according to an embodiment of the present disclosure. FIGS. 15 to 17 are cross-sectional views of an impeller according to embodiments of the present disclosure.

Referring to FIGS. 13 to 17, an impeller 500 may include a body 510, a coupling hole 516, a blade 520, grooves 530 and 540, and stepped portions 550 and 560. However, the impeller 500 can be implemented except for some of these components and does not exclude additional components.

An embodiment of the present disclosure describes the impeller 500 formed of a plastic material, by way of example.

The body 510 may include an outer peripheral surface 512 and a lower surface 514. The outer peripheral surface 512 of the body 510 may be referred to as a "hub." The outer peripheral surface 512 of the body 510 may be inclined downward as the outer peripheral surface 512 is away from the rotating shaft 300. An axially upper area of the outer peripheral surface 512 of the body 510 may have a smaller radius than an axially lower area of the outer peripheral surface 512. The blade 520 may be formed on the outer peripheral surface 512 of the body 510. The lower surface 514 of the body 510 may face the second impeller cover 420 and the coupling portion 120 of the housing 100.

The coupling hole 516 may be formed in a central area of the body 510. At least a portion of the coupling hole 516 may be penetrated by an upper area of the rotating shaft 300. The coupling hole 516 may be disposed in the upper area of the rotating shaft 300.

An embodiment of the present disclosure describes that the coupling hole 516 is formed in a hole shape, by way of example. However, the coupling hole 516 may have a groove shape that is concave at the bottom, and a bushing (not shown) may be disposed between the coupling hole 516 and the rotating shaft 300.

The blade 520 may be formed on the outer peripheral surface 512 of the body 510. The blade 520 may extend from the outer peripheral surface 512 of the body 510 to a radially outer side and an axially upper portion of the body 510. The blade 520 may include a plurality of blades that are spaced apart from each other in the circumferential direction.

The grooves 530 and 540 may be formed on the lower surface 514 of the body 510. The grooves 530 and 540 may be concavely formed upward from the lower surface 514 of the body 510. That is, the impeller 500 according to an embodiment of the present disclosure is configured such the area excluding the coupling hole 516 is not empty, and only the grooves 530 and 540 formed on the lower surface 514 are empty. Through this, since a weight of a lower area of the body 510 of the impeller 500 increases, a contact between the blade 520 of the impeller 500 and the inner surface of the impeller cover 400 can be prevented by minimizing deformation of the impeller 500 that occurs during a high-speed rotation. Further, since the contact between the blade 520 of the impeller 500 and the inner surface of the impeller cover 400 is prevented, the efficiency of the motor can be improved by minimizing an air gap between the blade 520 of the impeller 500 and the inner surface of the impeller cover 400. In addition, the manufacturing cost of the product can be reduced by increasing the weight of the lower area of the body 510 of the impeller 500 without adding a separate configuration of the impeller 500.

Furthermore, the manufacturing processes can be reduced by reducing a cooling time due to an excessive thickness of the body 510 while reducing the material cost through the grooves 530 and 540, and deformation of the product, such as a sink mark, due to a shrinkage phenomenon that occurs during the cooling can be reduced.

Referring to FIG. 15, the grooves 530 and 540 may include a plurality of grooves. The plurality of grooves may include a first groove 530 and a second groove 540 disposed inside the first groove 530. The first groove 530 and the second groove 540 may be radially spaced apart from each other. The first groove 530 and the second groove 540 may be spaced apart in the circumferential direction. The first groove 530 and the second groove 540 may be concentric. When the lower surface 514 of the impeller 500 is viewed from an axially lower part of the impeller 500, an outer peripheral surface and an inner peripheral surface of each of the first groove 530 and the second groove 540 may be formed in a circular shape.

An axial height of the first groove 530 may be less than an axial height of the second groove 540. Through this, rigidity of the body 510 can be secured by setting a minimum area of the body 510 between the outer peripheral surface 512 of the body 510 and the first groove 530, and the efficiency of a reduction in the manufacturing cost can be maximized due to a size of the second groove 540. For example, a minimum length between the outer peripheral surface 512 of the body 510 and the inner peripheral surface of the first groove 530 is preferably 2 mm or more.

An inner surface of the second groove 540 may have a constant radius of curvature. On the other hand, an inner surface of the first groove 530 may be formed so that a radius of curvature of a radially outer area is greater than a radius of curvature of a remaining area. Through this, the rigidity of the body 510 can be secured by setting the minimum area of the body 510 between the outer peripheral surface 512 of the body 510 and the first groove 530, and the efficiency of a reduction in the manufacturing cost can be maximized due to an increase in the size of the second groove 540.

The axial length or height of each of the first groove 530 and the second groove 540 may be 0.1 to 0.8 times an axial height of the body 510 of the impeller 500. Through this, an amount of deformation of the impeller 500 in the axial direction can be minimized.

The first stepped portion 550 may connect a radially inner end of the first groove 530 to a radially outer end of the second groove 540. The first stepped portion 550 may be disposed axially above the lower surface 514 of the body 510.

The second stepped portion 560 may connect a radially inner end of the second groove 540 to the coupling hole 516. The second stepped portion 560 may be disposed axially above the lower surface 514 of the body 510. Through this, damage to the product can be prevented by minimizing stress concentration that occurs when the rotating shaft 300 is press-fitted into the coupling hole 516.

FIG. 15 illustrates the second stepped portion 560 radially overlaps the first stepped portion 550, by way of example. However, the second stepped portion 560 may be disposed above the first stepped portion 550. Through this, the present disclosure can prevent damage to the product by minimizing stress concentration that occurs when the rotating shaft 300 is press-fitted into the coupling hole 516.

A radial length between the first groove 530 and the second groove 540 may be greater than a radial length between the first groove 530 and the outer peripheral surface 512 of the body 510. For example, it can be understood from FIG. 15 that a radial length of the first stepped portion 550 is greater than a radial length of the lower surface 514 of the body 510.

The radial length between the first groove 530 and the second groove 540 may be greater than a radial length between the second groove 540 and the coupling hole 516. For example, it can be understood from FIG. 15 that the radial length of the first stepped portion 550 is greater than a radial length of the second stepped portion 560.

Referring to FIG. 16, it can be understood that the first stepped portion 550 is deleted in the embodiment of FIG. 15. In this case, the axially deformation of the impeller 500 can be reduced compared to the embodiment of FIG. 15.

Referring to FIG. 17, it can be understood that the second stepped portion 560 is deleted in the embodiment of FIG. 16. In this case, the axially deformation of the impeller 500 can be reduced compared to the embodiment of FIG. 16.

A radius of curvature of a radially inner area of the second groove 540 may be greater than a radius of curvature of a remaining area of the second groove 540. Through this, the present disclosure can minimize damage to the product by reducing a press-fit zone that occurs when the rotating shaft 300 is press-fitted into the coupling hole 516.

FIGS. 15 to 17 illustrate that the number of plurality of grooves 530 and 540 is two, by way of example, but three or more grooves may be used.

Alternatively, one groove may be used. In this case, it may be understood that one of the first groove 530 and the second groove 540 is excluded.

For example, when the second groove 540 is excluded in the embodiment of FIG. 15, the first stepped portion 550 and the second stepped portion 560 disposed between the first groove 530 and the coupling hole 516 may be connected to each other. In this case, a radius of curvature of a radially outer area of the first groove 530 may be greater than a radius of curvature of a remaining area of the first groove 530, and the first groove 530 may be disposed closer to the outer peripheral surface 512 of the body 510 than the coupling hole 516.

Some embodiments or other embodiments of the present disclosure described above are not exclusive or distinct from each other. Some embodiments or other embodiments of the present disclosure described above can be used together or combined in configuration or function.

For example, configuration "A" described in an embodiment and/or the drawings and configuration "B" described in another embodiment and/or the drawings can be combined with each other. That is, even if the combination between the configurations is not directly described, the combination is possible except in cases where it is described that it is impossible to combine.

The above detailed description is merely an example and is not to be considered as limiting the present disclosure. The scope of the present disclosure should be determined by rational interpretation of the appended claims, and all variations within the equivalent scope of the present disclosure are included in the scope of the present disclosure.

The invention claimed is:

1. A motor comprising:
   a housing;
   a bearing disposed in the housing;
   a rotating shaft rotatably coupled to the bearing;
   an impeller cover disposed at an upper part of the housing;
   an impeller disposed inside the impeller cover and coupled to the rotating shaft, the impeller comprising (i) a body and (ii) a plurality of blades that are disposed at an outer peripheral surface of the body;

a magnet coupled to a lower portion of the rotating shaft;
a stator that is coupled to the housing and faces the magnet; and
a coil wound around the stator,
wherein the impeller defines:
- a coupling hole that is defined at a central area of the body of the impeller and coupled to the rotating shaft, and
- a plurality of grooves that are concavely recessed upward relative to a lower surface of the body of the impeller, wherein the plurality of grooves comprise:
- a first groove that extends in a circumferential direction, and
- a second groove that is disposed radially inside the first groove and extends in the circumferential direction, wherein an inner surface of the second groove has a constant radius of curvature, and
wherein an inner surface of the first groove has a shape in which a radius of curvature of a radially outer area of the first groove is greater than a radius of curvature of a remaining area of the first groove.

2. The motor of claim 1, wherein the first and second grooves are radially spaced apart from one another.

3. The motor of claim 1, wherein an outer peripheral surface and an inner peripheral surface of each of the first and second grooves have circular shapes.

4. The motor of claim 1, wherein an axial height of the first groove in an axial direction of the rotating shaft is less than an axial height of the second groove in the axial direction.

5. The motor of claim 1, wherein the impeller further comprises a first stepped portion that connects a radially inner end of the first groove to a radially outer end of the second groove, the first stepped portion being disposed above the lower surface of the body.

6. The motor of claim 5, wherein the impeller further comprises a second stepped portion that connects a radially inner end of the second groove to the coupling hole, the second stepped portion being disposed above the lower surface of the body and radially overlapping with the first stepped portion.

7. The motor of claim 5, wherein the impeller further comprises a second stepped portion that connects a radially inner end of the second groove to the coupling hole, the second stepped portion being disposed above the lower surface of the body.

8. The motor of claim 1, wherein a radial distance between the first groove and the second groove is greater than a radial distance between the first groove and the outer peripheral surface of the body.

9. The motor of claim 1, wherein a radial distance between the first groove and the second groove is greater than a radial distance between the second groove and the coupling hole.

10. The motor of claim 1, wherein the inner surface of the first groove comprises:
- a first portion that is disposed at the radially outer area of the first groove and defines a first radius of curvature; and
- a second portion that is disposed radially inward relative to the first portion and defines a second radius of curvature less than the first radius of curvature.

11. The motor of claim 1, wherein the first and second grooves are concentric.

12. The motor of claim 1, wherein an axial height of each of the first and second grooves in an axial direction of the rotating shaft is 0.1 to 0.8 times an axial height of the body of the impeller in the axial direction.

13. The motor of claim 1, wherein an axial end of the coupling hole is disposed between an upper end of the first and second grooves and the lower surface of the body of the impeller.

14. The motor of claim 1, wherein the lower surface of the body of the impeller defines (i) a lower circumference of the body and (ii) a recessed region that is disposed radially inward relative to the lower circumference of the body and that is recessed upward from the lower surface of the body, and
wherein the first and second grooves are further recessed upward from the recessed region.

15. The motor of claim 1, wherein an axial end of each of the coupling hole and the first and second grooves is flush with the lower surface of the body of the impeller.

16. The motor of claim 1, wherein an axial height of each of the first and second grooves in an axial direction of the rotating shaft is 0.1 to 0.8 times an axial length of the coupling hole in the axial direction.

* * * * *